United States Patent [19]

Ikeda

[11] Patent Number: 5,549,282
[45] Date of Patent: Aug. 27, 1996

[54] VIBRATION PROOFING STRUCTURE

[75] Inventor: Masahiko Ikeda, Kamakura, Japan

[73] Assignee: Kiyoko Ikeda, Tokyo, Japan

[21] Appl. No.: 241,900

[22] Filed: May 13, 1994

[30]  Foreign Application Priority Data

May 14, 1993 [JP] Japan .................................. 5-147122

[51] Int. Cl.⁶ ............................................. B60G 13/06
[52] U.S. Cl. ............................ 267/136; 267/137; 188/266
[58] Field of Search ........................... 188/266; 267/136, 267/137, 146.5; 248/636, 638

[56] References Cited

U.S. PATENT DOCUMENTS

| | | |
|---|---|---|
| 2,312,718 | 3/1943 | Kouyoumjian . |
| 2,760,552 | 8/1956 | Decker . |
| 3,625,466 | 12/1971 | Marshall et al. . |
| 3,821,859 | 7/1974 | McWatters ............................... 267/136 |
| 4,238,104 | 12/1980 | Hamilton ................................. 267/136 |
| 4,858,459 | 8/1989 | Takahashi ................................ 267/137 |

FOREIGN PATENT DOCUMENTS

| | | |
|---|---|---|
| 1362687 | 4/1964 | France . |
| 60-184736 | 9/1985 | Japan . |
| 3-140651 | 6/1991 | Japan . |
| 3140651 | 6/1991 | Japan ..................................... 267/136 |
| 2164843 | 4/1986 | United Kingdom .................. 267/136 |

*Primary Examiner*—Matthew C. Graham
*Attorney, Agent, or Firm*—Stroock & Stroock & Lavan

[57] ABSTRACT

A vibration proofing structure having a first base and a first oil damper mounted thereon having a first tank mounted on the first base, first pistons arranged in the first tank, and a first rod having a first end mounted on the first pistons and a second end outwardly extending from the first tank. The structure further includes a second oil damper including a second tank, second pistons arranged in the second tank and a second rod having a first end mounted on the second pistons and a second end outwardly extending from said second tank. A second base is provided on which the second end of the second rod is mounted. The first and second oil dampers are juxtaposed to each other and the first rod is connected to the second tank so as to permit the first and second oil dampers to rotate relative to each other.

18 Claims, 10 Drawing Sheets

5,549,282

VIBRATION PROOFING STRUCTURE

BACKGROUND OF THE INVENTION

This invention relates to a vibration proofing structure, and more particularly to a vibration proofing structure suitable for use for various applications including a seat for a vehicle or the like, a construction, an internal combustion engine, a rotary machine, a machine tool, a precision instrument, a measuring instrument and the like.

Conventionally, a vibration proofing structure which is constructed so as to incorporate a spring therein has been principally used for a driver's seat of each of a car and a truck, a seat provided in a driver's cab of each of a train and a construction machine and the like. Also, a vibration proofing mechanism or structure having a vibration proof rubber, an oil damper or the like incorporated therein has been used for a construction such as a general construction, nuclear facilities, a tank, plant facilities or the like. Further, a vibration proofing structure in which a spring, a vibration proof rubber, an oil damper or the like is incorporated has been used for an internal combustion engine, a rotary machine, a machine tool, a precision instrument, a measuring instrument or the like.

Unfortunately, such conventional vibration proofing structures as described above each fail to exhibit a satisfactory vibration proofing function. In view of the above, the inventor developed a vibration proofing mechanism or structure which is capable of effectively absorbing vibration, as disclosed in Japanese Patent Application Laid-Open Publication No. 140651/1991. The vibration proofing structure disclosed is constructed in such a manner that a base and an oil damper including a cylinder in which a piston and a rod connected to each other are connected to each other through a guide mechanism for guiding the base and oil damper so as to permit both to be linearly reciprocated relative to each other. Also, the vibration proofing structure includes a mounting bar which is mounted at one end thereof on the rod in a manner to extend perpendicularly to the rod and projected at the other end thereof from the cylinder.

The vibration proofing structure disclosed in Japanese Patent Application Laid-Open Publication No. 140651/1991 which is constructed as described above is substantially increased in vibration proofing function as compared with the above-described conventional structures and exhibits satisfactory applicability to various technical fields. Nevertheless, the vibration proofing structure disclosed is disadvantageous in that it is often required to change a configuration thereof depending on technical fields to which it is applied.

SUMMARY OF THE INVENTION

The present invention has been made in view of the foregoing disadvantage of the prior art.

Accordingly, it is an object of the present invention to provide a vibration proofing structure which is capable of being effectively applicable to a variety of fields while exhibiting satisfactory vibration proofing performance.

It is another object of the present invention to provide a vibration proofing structure which is capable of exhibiting satisfactory vibration proofing performance against vibration in a horizontal direction.

It is a further object of the present invention to provide a vibration proofing structure which is capable of exhibiting satisfactory vibration proofing performance against vibration in both a horizontal direction and a vertical direction.

In accordance with the present invention, a vibration proofing mechanism or structure is provided. The vibration proofing structure comprises a first base and a first oil damper mounted on the first base. The first oil damper includes a first tank mounted on the first base, first pistons arranged in the first tank, and a first rod mounted at one end thereof on the first pistons so as to render an axis thereof perpendicular to a longitudinal axis of the first pistons and outwardly extending at the other end thereof from the first tank. The vibration proofing structure further comprises a second oil damper which includes a second tank, second pistons arranged in the second tank and a second rod mounted at one end thereof on the second pistons so as to render an axis thereof perpendicular to a longitudinal axis of the second pistons and outwardly extending at the other end thereof from the second tank, and a second base on which the other end of the second rod of the second oil damper is mounted. The first and second oil dampers are arranged in juxtaposition to each other and the first rod of the first oil damper is connected at the other end thereof to the second tank of the second oil damper.

In a preferred embodiment of the present invention, each of the first and second bases are formed into a plate-like shape. Alternatively, they may be formed into any other suitable shape so long as they are satisfactorily connected to an object.

The first and second oil dampers may be arranged in a manner to be superposed on each other. Alternatively, they may be horizontally juxtaposed to each other. In a preferred embodiment of the present invention, the first oil damper is mounted with respect to the first base and the second oil damper is mounted with respect to the second base.

It is desirable that the first tank of the first oil damper is rotatably mounted on the first base and the second rod of the second oil damper is rotatably mounted on the second base. Also, it is desirable that the first rod of the first oil damper is connected at the other end thereof to the second tank of the second oil damper so as to permit the first and second oil dampers to rotate relative to each other.

In a preferred embodiment of the present invention, the vibration proofing structure further comprises an intermediate plate fixed on the second oil damper so as to be arranged between the first oil damper and the second oil damper which are connected to each other so as to rotated relative to each other. The intermediate plate is provided with a bearing in which the other end of the first rod of the first oil damper is rotatably supported. The structure further comprises supports each mounted on the first base so as to extend therefrom and positioned on each of both sides of the first oil damper so as to be spaced at a small interval therefrom, and rod members each mounted on each of the supports so as to inwardly extend therefrom in a direction parallel to a direction of sliding of the pistons, to thereby connect the intermediate plate and each of the supports to each other therethrough in a non-fixed manner.

Also, in accordance with the present invention, a vibration proofing structure for a large load is provided. The vibration proofing structure comprises a first base and a second base; a plurality of rails mounted at predetermined positions on the first base; guide members each fittedly mounted on each of the rails so as to be slidable in a longitudinal direction of the rail; a plurality of horizontal-type oil dampers each rotatably mounted on each of the guide members and including a tank rotatably mounted on each of the guide members, pistons arranged in the tank, a rod mounted at one end thereof on the pistons so as to render an axis thereof perpendicular to a longitudinal axis of the pistons and outwardly extending at the other end thereof from the tank so as to be slidably inserted through the second base; a plurality of struts each mounted on the first base for bearing a load downwardly applied through the second base, arranged so as to upwardly extend therefrom and provided on an upper end thereof with a hemispherical member; and holding plates each arranged on each of the horizontal-type oil dampers. The rod is inserted at the other end thereof through the holding plate so as to permit the horizontal-type oil damper to be rotated about the rod with respect to the holding plate and is inserted through the second base while being rotatably supported by means of a bearing so as to permit the horizontal-type oil damper to be rotated with respect to the second base.

The vibration proofing structure for a large load generally constructed as described above is featured in that the support rods are mounted on an upper surface of each of the holding plates so as to be spaced from each other in a longitudinal direction of the holding plate and upwardly extend therefrom. Each of the support rods is vertically slidably inserted through the second base and provided at an upper end thereof with a washer-like spring bearing, and is fitted on a portion thereof defined between the spring bearing and the second base with a spring of a predetermined spring constant. The rod is mounted on an upper end thereof with a washer-like spring bearing and fitted on a portion thereof defined between the spring bearing and the second base with a spring of a predetermined spring constant. The vibration proofing structure also comprises a plurality of vertical-type oil dampers arranged in proximity to the horizontal-type oil dampers. The vertical-type oil dampers each include a vertical-type cylinder, a piston arranged in the cylinder to define an upper oil chamber and a lower oil chamber therethrough in the vertical-type cylinder and formed with an oil passage means in a manner to vertically extend therethrough, and a control means for externally controlling the amount of oil transferred through the oil passage means between the upper oil chamber and the lower oil chamber. The vertical-type oil dampers each are provided therein with a large spring in a manner to be interposed between the piston and a bottom of the vertical-type cylinder. The large spring has a spring constant at least about three times as large as the spring constant of each of the above-described springs.

In a preferred embodiment of the present invention, the spring constant of each of the springs arranged between the washer-like spring bearings and the second base is set to be 10 to 25 and the spring constant of the large spring arranged between the piston and the bottom of the vertical-type cylinder is set to be about 30 to 80.

In a preferred embodiment of the present invention, the control means for externally controlling the amount of oil transferred between the upper oil chamber and the lower oil chamber through the oil passage means comprises a bowl-like cap arranged on the piston for controlling the amount of oil transferred between the upper oil chamber and the lower oil chamber through the oil passage means, a spring arranged between the bowl-like cap and an upper surface of the piston to upwardly force the cap, a rod member which is vertically arranged in the vertical-type cylinder so as to be upwardly projected at an upper end thereof from the vertical-type cylinder and on which the piston is fitted, a pipe fitted on the rod member in the vertical-type cylinder for adjusting a gap between the bowl-like cap and the upper surface of the piston, and an adjustment nut threadedly fitted on the rod member so as to be positioned at an upper end of the pipe, so that slight vertical movement of the adjustment nut permits the gap between the bowl-like cap and the upper surface of the piston to be adjusted to control the amount of oil transferred between the upper oil chamber and the lower oil chamber. The large spring is arranged between the piston and the bottom of the vertical-type cylinder while being kept compressed to a predetermined degree.

BRIEF DESCRIPTION OF THE DRAWINGS

These and other objects and many of the attendant advantages of the present invention will be readily appreciated as the same becomes better understood by reference to the following detailed description when considered in connection with the accompanying drawings wherein:

FIG. 5 is a vertical sectional view showing an example of a vertical-type oil damper used for a construction or the like;

FIG. 6 is a vertical sectional view showing an example of a strut used for a construction or the like;

FIG. 7 is a vertical sectional view showing another example of a vertical-type oil damper used for a construction or the like;

DETAILED DESCRIPTION OF THE PREFERRED EMBODIMENTS

Now, a vibration proofing structure according to the present invention will be described hereinafter with reference to the accompanying drawings.

Figure 1:
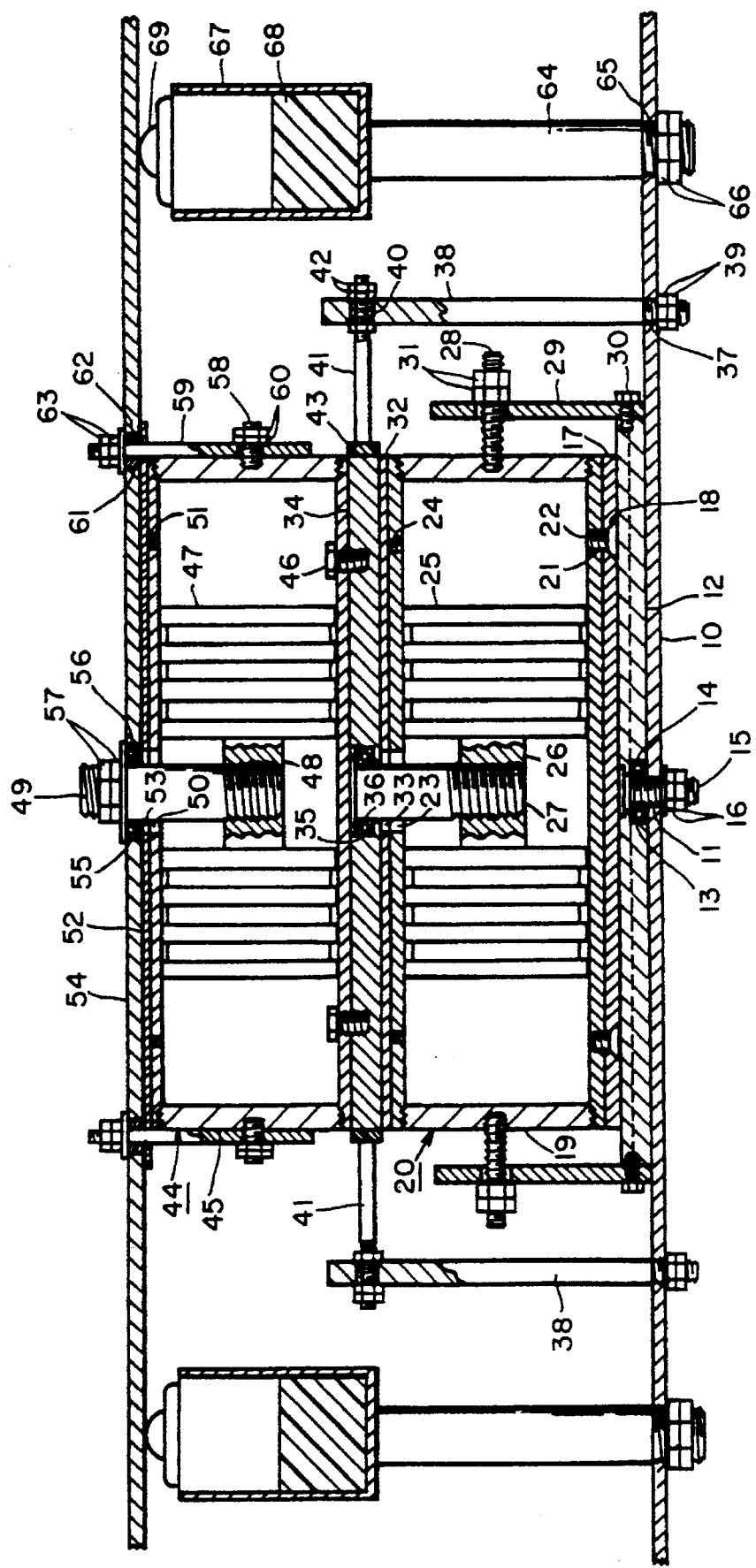
FIG. 1 is a vertical sectional view showing an embodiment of a vibration proofing structure according to the present invention.
Figure 2:
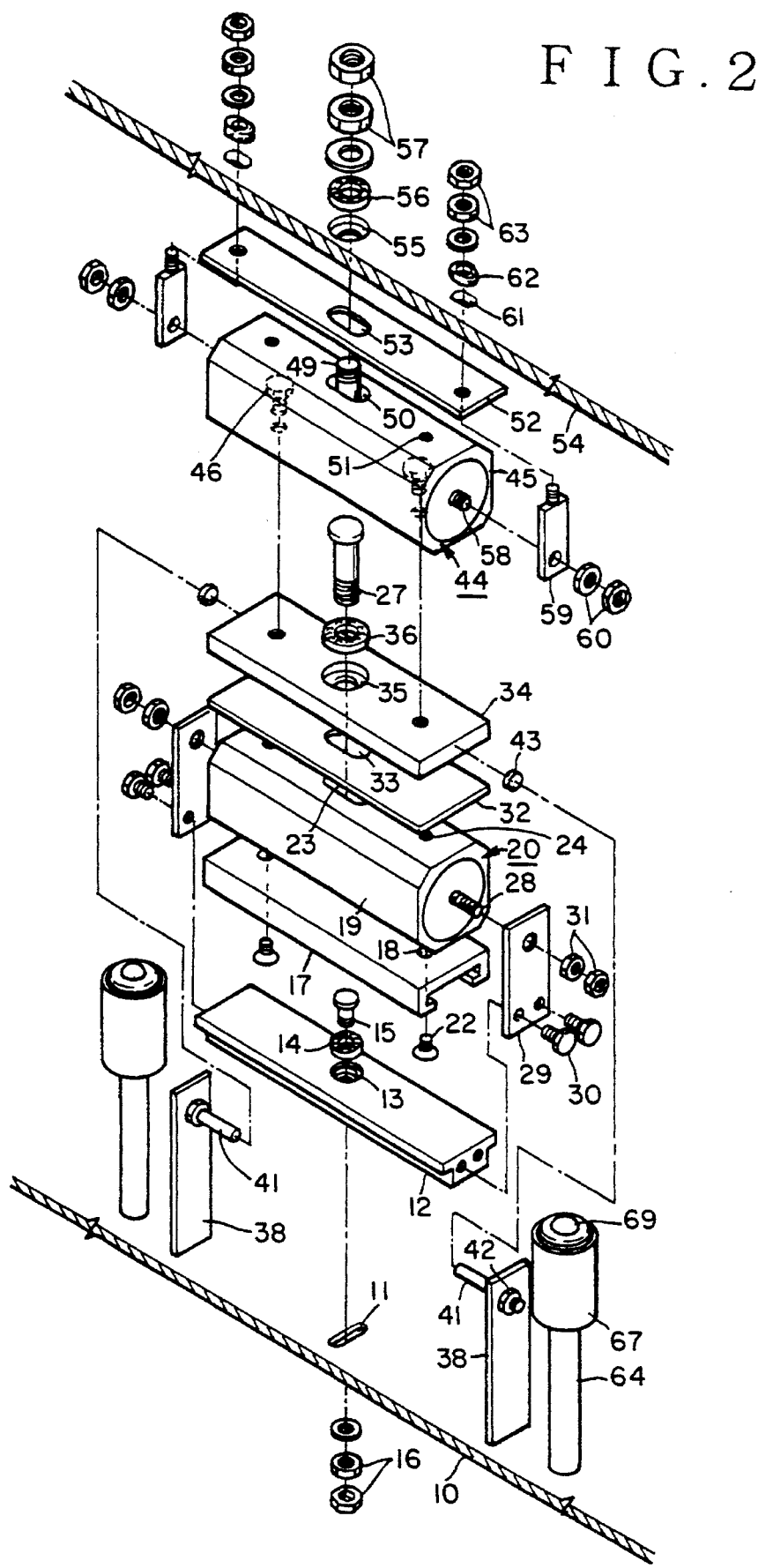
FIG. 2 is an exploded perspective view of the vibration proofing structure shown in FIG. 1.
Figure 3:
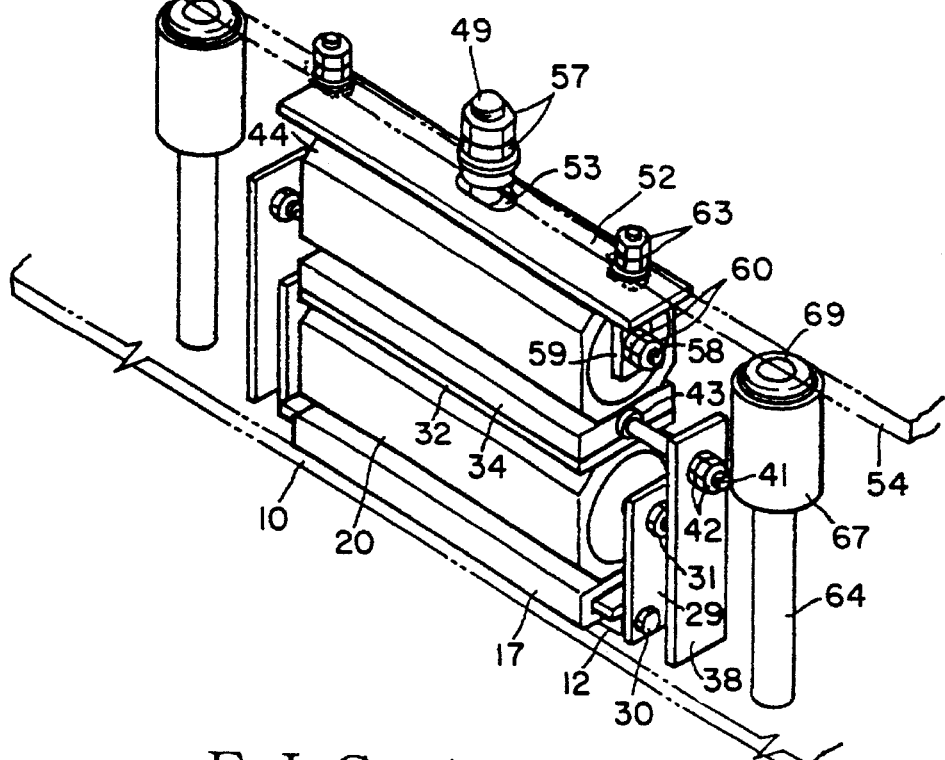
FIG. 3 is a perspective view of the vibration proofing structure shown in FIG. 1.

Referring first to FIGS. 1 to 3, an embodiment of a vibration proofing structure according to the present invention is illustrated. A vibration proofing structure of the illustrated embodiment includes a first or lower base 10, which is formed with a slot-like through-hole 11. The vibration proofing structure also includes an elongated rail 12 provided separate from the base 10 and formed into a T-like shape in section. The rail 12 is formed at a central portion thereof with a vertically extending aperture 13. The aperture 13 is formed at a lower portion thereof with a circular depression (not shown), in which a bearing 14 is fitted. Reference numeral 15 designates a bolt which is downwardly inserted through the aperture 13 and of which a lower portion is inserted into the through-hole 11 of the first or lower base 10. Then, the bolt 15 is threadedly fitted on a lower end thereof with a double nut 16, resulting in the rail 12 being mounted on the rail 12 so that a longitudinal axis thereof may be rendered perpendicular to that of the through-hole 11 of the lower base 10. The bolt 15 is formed into a diameter smaller than a size of the through-hole 11 in a lateral direction thereof, so that it may be reciprocated in a longitudinal direction of the through-hole 15 therein. Also, such construction and arrangement permit the rail 12 to be rotated about the bearing 14 in a horizontal direction.

The vibration proofing mechanism or structure of the illustrated embodiment also includes an elongated guide 17 which is formed of a plate-like material into a substantially T-shape in section of which an opening is defined at a bottom thereof, resulting in permitting the rail 12 to be fittedly received in the guide 17 through the opening. The guide 17 is provided at each of portions of a top thereof spaced from each other in a longitudinal direction thereof with a bolt hole 18.

The vibration proofing structure of the illustrated embodiment further includes a tank 19 for a first or lower oil damper 20, which tank is formed into a shape like a rectangular cylinder and arranged so that a longitudinal axis thereof extends in the same direction as that of the guide 17. The tank 19, as shown in FIG. 1, is formed at a bottom thereof with bolt holes 21 in a manner to positionally correspond to the bolt holes 18 of the guide 17, so that bolts 22 are inserted into the bolt holes 18 and 21, resulting in the tank 19 being securely mounted on the guide 17. The tank 19 of the lower oil damper 20 is formed at a central portion of a top thereof with a slot-like aperture 23 of which a longitudinal axis extends in a longitudinal direction of the tank 19, as well as at each of portions of the top thereof spaced from each other in the longitudinal direction of the tank 19 with a small aperture 24, through which oil is fed to each of chambers defined on both sides in an interior of the tank 19. After the tank 19 is thus fed with oil, the apertures 24 each are closed with a screw. The tank 19 of the lower oil damper 20, as shown in FIG. 1, is provided therein with a pair of pistons 25, which are arranged in a row in the longitudinal direction of the tank 19 and connected to each other through a connection bar 26 interposedly arranged therebetween. The connection bar 26 is threadedly mounted at a central portion thereof with a rod 27 in a manner to upwardly extend therefrom and then project through the aperture 23 from the tank 19. The tank 19 includes end plates mounted on both ends thereof, each of which is threadedly mounted thereon with a bolt 28 in a manner to horizontally outwardly extend therefrom. Reference numeral 29 designates a support of which a lower end is supportedly mounted on each of both ends of the rail 12 defined in the longitudinal direction thereof by means of bolts 30. The supports 29 each may be formed into a plate-like shape and are formed at an upper portion thereof with a hole, through which the bolt 28 is inserted. Then, the bolt 28 is threadedly mounted on a distal end thereof with a double nut 31. The tank 19 is securely mounted on the top thereof with a closing plate 32 to completely close the small apertures 24. The closing plate 32 is formed at a central portion thereof with an elongated slot-like aperture 33 of the same configuration as the slot-like aperture 23 in a manner to be positionally aligned with the aperture 23.

The closing plate 32 mounted on the tank 19 of the lower oil damper is covered with an intermediate plate 34 formed into substantially the same configuration as the closing plate 32. The intermediate plate 34 is formed at a central portion thereof with an aperture 35, in which a bearing 36 is fitted, to thereby rotatably support an upper end of the rod 27 therein. The lower base 10 is formed at a portion thereof positioned outside each of the supports 29 with an aperture 37, through which a support 38 is vertically inserted at a lower end thereof. The supports 38 may be formed into a plate-like shape. Then, the supports 38 each are fixed at the lower end thereof to the lower base 10 by means of a double nut 39. The supports 38 each are formed at an upper portion thereof with an aperture 40 extending in a thickness direction thereof or in a horizontal direction, through which a rod 41 is inserted at one end or a proximal end thereof. Then, the rod 41 is mounted in the hole 40 by means of a pair of nuts 42 arranged in a manner to interpose the support 38 therebetween. The rod 41 is mounted on the other end or a distal end thereof with a pad 43 made of a rubber material, by virtue of which the rod 41 is abutted at the distal end thereof against an end surface of each of the intermediate plates 34.

In addition, the vibration proofing mechanism or structure of the illustrated embodiment includes a second or upper oil damper 44, which is constructed in substantially the same manner as the first or lower oil damper 20 described above and mounted on the intermediate plate 34. The upper oil damper 44 includes a tank 45 which is integrally joined at a bottom to the intermediate plate 34 by means of bolts 46. The tank 45, as shown in FIG. 1, is provided therein with a pair of pistons 47, which are arranged in a row in a longitudinal direction of the tank 45 and connected to each other through a connection bar 48 interposedly arranged therebetween. The connection bar 48 is threadedly mounted at a central portion thereof with a rod 49 in such a manner so as to upwardly extend therefrom and then upwardly outwardly project from the tank 45 through a slot-like aperture 50 formed at a top of the tank 45. The top of the tank 45 is formed at each of portions thereof spaced from each other in a longitudinal direction of the tank 45 with a small aperture 51, which is closed with a screw. The tank 45 of the second oil damper 44 is securely mounted on the top thereof with a closing plate 52. The closing plate 52 is formed at a central portion thereof with a slot-like aperture 53 so as to be aligned with the aperture 50 of the tank 45 and is provided thereon with a second or upper base 54. The second or upper base 54 is formed with an aperture 55 so as to be aligned with the aperture 50 of the tank 45 and the aperture 53 of the closing plate 52, so that the rod 49 is projected from an interior of the tank 45 through the apertures 50, 53 and 55 to an exterior of the vibration proofing structure. The aperture 55 of the second or upper base 54 is fitted therein with a bearing 56 through which the rod 49 is supportedly inserted and then a double nut 57 is threadedly fitted on an upper end of the rod 49. The tank 45 of the upper oil damper 44 includes a pair of end plates to each of which a bolt 58 is threadedly connected at one end thereof. Reference numeral 59 designate a support which may be formed into a plate-like shape and is arranged on each of both sides of the tank 45 of the upper oil damper. The supports 59 each are formed at a lower portion thereof with a through-hole via which the bolt 58 is inserted. Then, the bolt 58 is threadedly fitted on the other end thereof with a double nut 60, so that the support 59 is vertically mounted on each of both sides of the tank 45 so as to upwardly extend therefrom. Also, the supports 59 each are arranged so as to be projected at an upper portion thereof from an aperture 61 formed through the upper base 54. The apertures 61 each are sealed with a rubber material 62 and the supports 59 each are threadedly fitted on an upper end thereof with a double nut 63, to thereby be securely joined to the upper base In the vibration proofing structure of the illustrated embodiment constructed as described above, a space of a predetermined interval is defined between the lower base 10 and the upper base 54 as shown in FIG. 1. The vibration proofing structure thus constructed is provided on both sides thereof with a pair of struts 64 for bearing a load downwardly applied to the upper base 54. More particularly, the struts 64 each are vertically mounted on the lower base 10 by inserting a lower portion of the strut 64 through an aperture 65 formed via the lower base 10 and threadedly fitting a double nut 66 on a lower end of the strut 64. The strut 64 is provided at an upper portion thereof with a cylinder 67 in which a rubber member 68 is fitted. Then, a suitable spring member (not shown) such as a leaf spring or the like is received in the cylinder 67 in a manner to be arranged on the rubber member 68, followed by mounting a hemispherical member 69 on a top of the cylinder 67. The hemispherical member 69 is kept contacted with a lower surface of the second or upper base 54.

Now, the manner of operation of the vibration proofing structure shown in FIGS. 1 to 3 will be described hereinafter.

Application of vibration to, for example, the lower base 10 is to cause the tank 19 of the lower oil damper 20 mounted on the lower base 10 to be vibrated. Even when the tank 19 of the lower oil damper 20 is vibrated, oil in the tank 19 of the lower oil damper 20 absorbs the vibration to prevent it from being transmitted to the rod 27. Nevertheless, the oil fails to fully prevent transmission of the vibration to the rod 27. A portion of the vibration which is thus slightly transmitted to the rod 27 causes the tank 45 of the upper oil damper 44 to be vibrated.

At this time, the rods 41 of the supports 38 act to push back the vibration transmitted to the upper oil damper 44 in an opposition direction, to thereby substantially reduce momentum of kinetic inertia energy caused by the instantaneous impact by a car which is running. Vibration of the tank 45 of the upper oil damper 44 is effectively absorbed by oil in the tank 45 of the damper 44, to thereby be prevented from being transmitted to the rod 49. Thus, vibration applied to the lower base 10 is substantially prevented from being transmitted to the upper base 54 to which the rod 49 is connected. Likewise, vibration applied to the upper base 54 is absorbed in the same manner as the above, resulting in being substantially prevented from being transmitted to the lower base 10.

Vibration in an oblique direction is applied to the vibration proofing structure depending on a place at which the structure is used and conditions under which it is used. The vibration proofing structure, as described above, is constructed so that the oil dampers 20 and 44 rotative relative to each other and relative to the upper and lower bases 10 and 54. Thus, application of oblique vibration to the vibration proofing structure causes relative rotation between the oil dampers and/or between the oil dampers and the bases, so that application of torsion to the structure may be effectively prevented, to thereby eliminate damage to the structure and an adverse effect on a vibration proofing function of the structure.

In use, it is required to adjust a position of each of the lower and upper oil dampers 20 and 44. Now, an operation of the adjustment will be described hereinafter. First, the nut 31, 42 and 60 by which the supports 29, 38 and 59 are respectively fastened are loosened. Then, any one of the nuts 31 is tightened to permit the guide 17 and tank 19 to be moved along the rail 12 in the longitudinal direction of the vibration proofing structure, resulting in aligning the bolt 15 for fixing the rail 12 and a center of the tank 19 with each other. Then, the nuts 31 are firmly tightened while keeping both aligned with each other, to thereby stationarily hold the tank 19 and the like. Then, the rod 27, the piston 25 and the like are moved in the longitudinal direction of the structure through the intermediate plate while tightening the nut 42 of one of the supports 38, to thereby position the rod 27 at the center of the tank 19, followed by tightening the nuts 47 to fix the rod 27 at the center of the tank 19. Concurrently, the upper tank 45 is automatically fixed at a predetermined position. Thereafter, the upper base 54 is moved in the longitudinal direction of the structure to position the rod 49 at the center of the tank 45 of the upper oil damper 44 and then the nuts 63 are tightened to fix the upper base 54 with respect to the tank 45.

The vibration proofing structure of the illustrated embodiment constructed as described above may be widely applied to a variety of fields such as a construction, various kinds of machines and the like. Now, application of the vibration proofing structure of the illustrated embodiment to a seat for a car, a construction equipment or the like will be described hereinafter with reference to FIG. 4.

Figure 4:
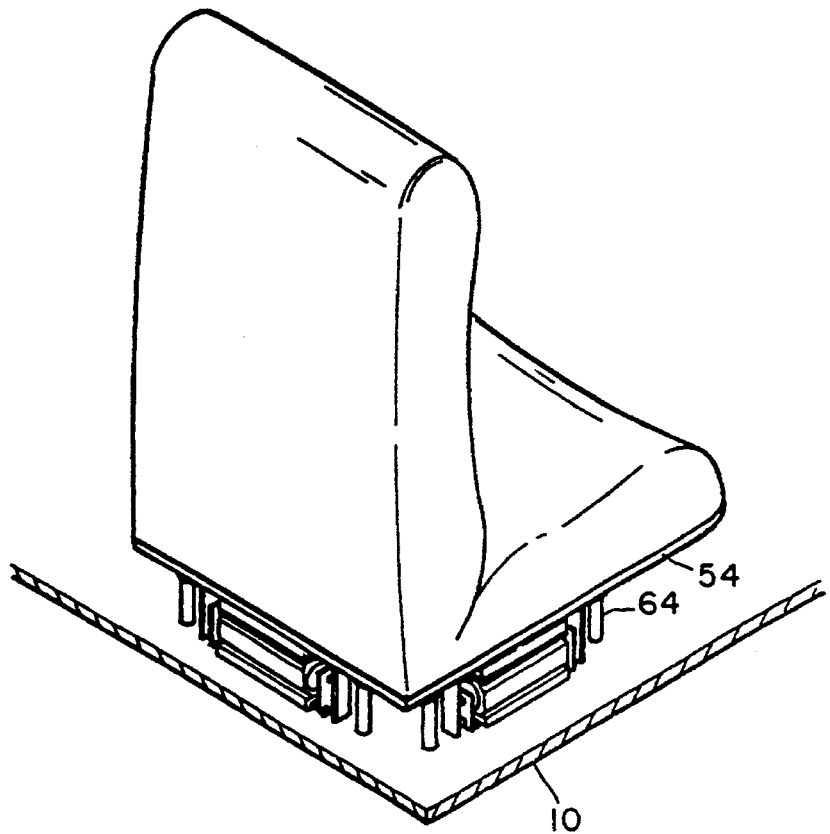
FIG. 4 is a perspective view showing a manner of use of the vibration proofing structure of FIG. 1.

In FIG. 4, four such vibration proofing structures are arranged in the form of a rectangular configuration between the lower base 10 and the upper base 54. A weight of the upper base 54 and load applied to the upper base 54 are substantially borne by the struts 64 and vibration in the vertical direction is absorbed by an elastic cushioning material such as the rubber member 68 of each of the struts 64.

An application of vibration in the lateral direction of the lower base 10 to the base 10 will be described. When vibration in the lateral direction of the lower base 10 is applied to the lower base 10, first two vibration proofing structures arranged in juxtaposition to each other in the longitudinal direction of the base 10 perpendicular to the lateral direction thereof each are operated in such a manner that the lower base 10, rail 12 and tank 19 are to be moved in the lateral direction while leaving the rod 27, connection bar 26 and piston 25 of the lower oil damper 20. However, oil received in the space defined outside each of the pistons 25 in the tank 29 acts to absorb the vibration to prevent it from being transmitted to the rod 27. Nevertheless, a portion of the vibration which fails to be absorbed by the oil is transmitted through the rod 27 and intermediate plate 34 to the upper oil damper 44. Then, the vibration is absorbed by oil received in the space defined outside each of the pistons 47 in the tank 45 of the upper oil damper 44, resulting in being substantially prevented from being transmitted through the rod 49 to the upper base 54.

The above-described vibration in the lateral direction constitutes vibration in the longitudinal direction with respect to second two vibration proofing structures arranged perpendicular to arrangement of the above-described first two vibration proofing structures juxtaposed to each other in the longitudinal direction. However, the vibration is substantially absorbed by the first two vibration proofing structures as described above, to thereby be minimized. Thus, the second two vibration proofing structures each are so operated that only the lower base 10 is moved by a slight distance in the lateral direction without moving the components of the structure except the base 10 while keeping the bolt 15 fitted in the through-hole 11 of the base 10, to thereby prevent the minimized vibration from being transmitted to the upper base 54.

The vibration proofing function of the structure carried out when vibration in the longitudinal direction of the lower base 10 is applied thereto will be readily understood from the vibration proofing function described above in connection with application of vibration in the lateral direction.

Application of vibration to the lower base 10 is carried out in the lateral and longitudinal directions of the base 10, as well as in oblique directions thereof. When vibration in any oblique direction is applied to the lower base 10, components of the vibration are transmitted to the first two vibration proofing structures and second two ones. The first and second vibration proofing structures each function to absorb the components in such a manner as described above, respectively, to thereby substantially prevent the vibration from being transmitted to the upper base 54.

As will be noted from the foregoing, the vibration proofing structure of the illustrated embodiment is so constructed that the rail 12, guide 17 and lower tank 19 are integrally rotatable with respect to the lower base 10. Also, the upper tank 45 and intermediate plate 34 are rotatable with respect to the rail 12, guide 17 and lower tank 19. Further, the upper tank 45 is rotatable with respect to the upper base 54. Such construction of the vibration proofing structure, when vibration of a large magnitude is obliquely applied to the lower substrate 10, permits upper and lower sections of the structure to rotate relative to each other at three rotatable positions described above, to thereby prevent torsion from being applied to the vibration proofing structure. Thus, the vibration proofing structure of the embodiment ensures safety in operation and effectively exhibits a satisfactory vibration proofing function.

Results of a test made on the seat shown in FIG. 4 for measuring vibration proofing performance of the vibration proofing structure of the illustrated embodiment are shown in Table 1. The test was carried out using three inspection units and in such a manner that an inspection needle of each of the units is abutted at a tip end thereof against each of the lower base 10, intermediate plate 34 and upper base 54. In the test, a degree of transmission of impact force applied to the lower substrate 10 to each of the inspection units was measured. Numerical values indicated in Table 1 are round.

TABLE I

| Impact Force Applied to Lower Base 10 (kg) | Impact Force Transmitted to Intermediate Plate 34 (kg) | Impact Force Transmitted to Upper Base 54 (g) |
| --- | --- | --- |
| 100 | 80 | 800 |
| 250 | 100 | 80 |
| 300 | 120 | 80 |
| 450 | 150 | 90 |

Figure 5:
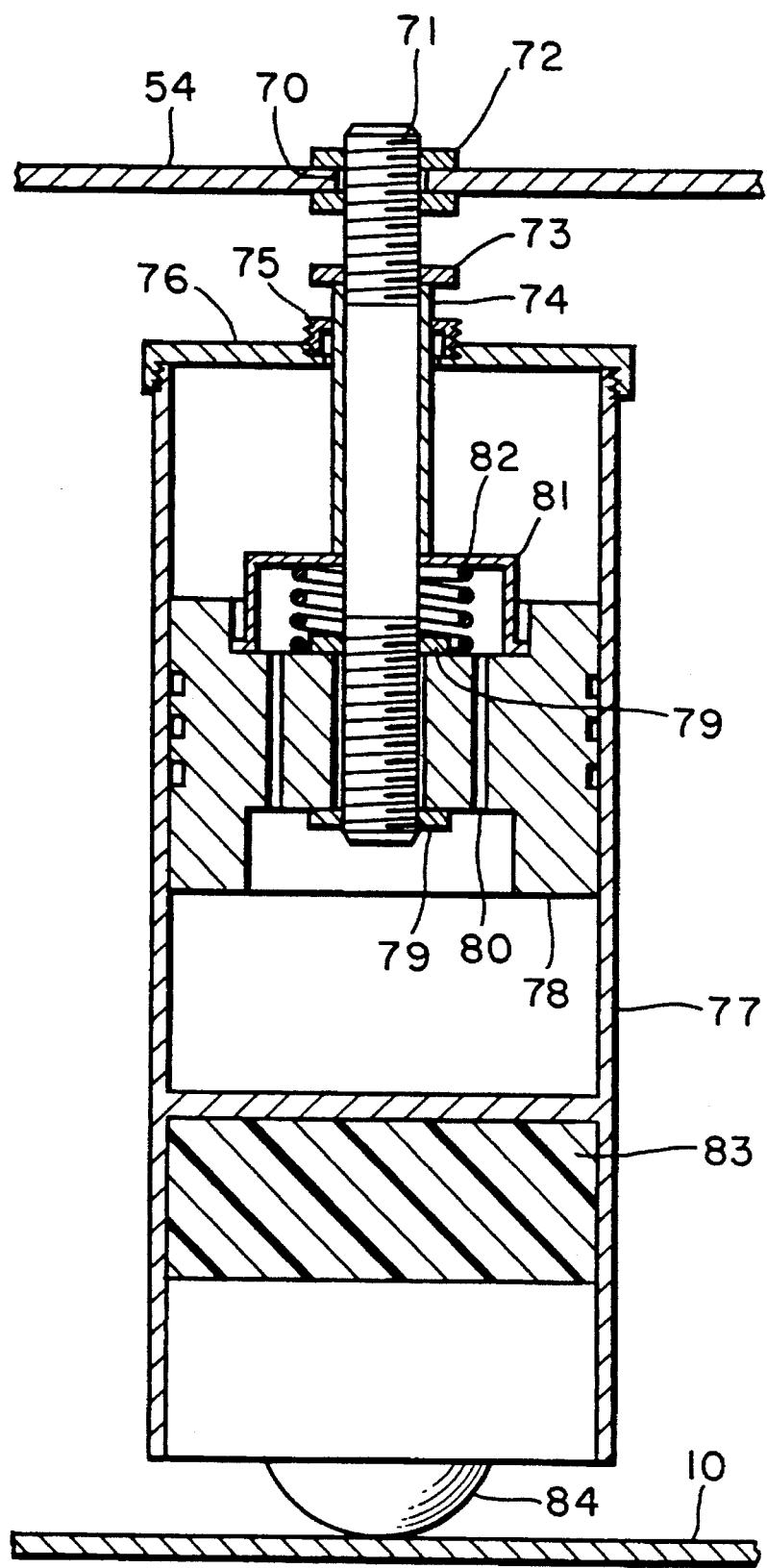

Referring now to FIG. 5, a vertical-type oil damper which may be incorporated between the lower base 10 and the upper base 54 is illustrated. The upper base 54 is formed with an aperture 70, through which a rod 71 is upwardly inserted. Then, upper and lower nuts 72 are threadedly fitted on the rod 71 so as to interpose the upper base 54 therebetween, resulting in the rod 71 being fixed to the upper base 54. Also, the rod 71 is threadedly fitted thereon with a adjustment nut 73 at a position below the lower nut 72. Further, the rod 71 is snugly fitted on a portion thereof positioned under the adjustment nut 73 with a pipe 74. The pipe 74 is fitted thereon with a cap-like ring 75, which is then threadedly fitted in a disc-like lid 76. The lid 76 is arranged so as to cover an upper end of a cylindrical tank 77. The tank 77 is provided at a central region therein with a piston 78, which is fittedly mounted on a lower portion of the rod 71. The rod 71 is threadedly fitted thereon with upper and lower nuts 79 so as to tightly interpose the piston 78 therebetween, to thereby securely hold the piston 78 on the rod 71. The piston 78 is formed with vertically extending through-holes 80 of a small size which act as an oil passage means. Reference numeral 81 designates a bowl-like cap arranged between the pipe 74 and the piston 78 so as to cover the through-holes 80. Reference numeral 82 designates a coiled spring interposedly arranged between the cap 81 and the piston 78. Downward movement of the adjustment nut 73 to forcedly press a lower end of the cap 81 against the piston 78 through the pipe 74 prevents oil from flowing through the through-holes 80. When the adjustment nut 73 is slightly raised, a gap of a slight distance is formed between the cap 81 and the piston 78 to permit a slight amount of oil to vertically flow via the through-holes 80. The tank 77 used under such conditions is provided at a bottom thereof with a substantially hemispherical member 84 through a cushioning member 83 made of rubber or the like, so that the member 84 is abutted at a lower distal end thereof against the lower base 10.

Figure 6:
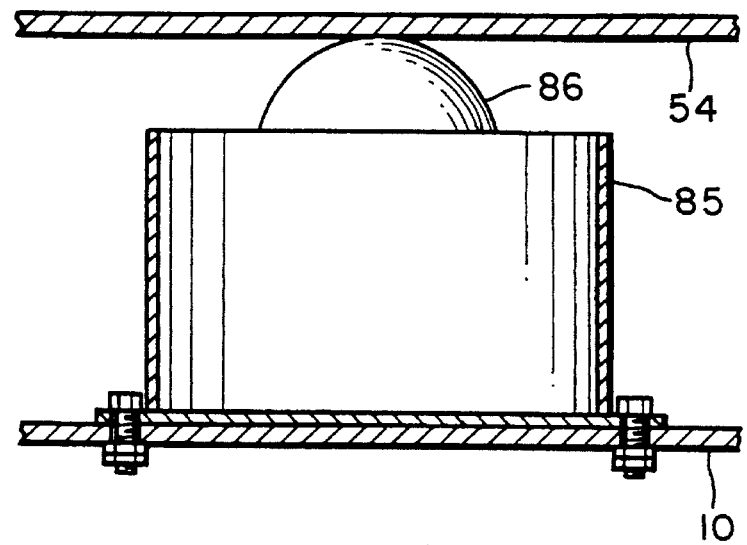

The oil damper shown in FIG. 5 may be used in combination with a strut shown in FIG. 6. The strut shown in FIG. 6 is arranged between the lower base 10 and the upper base 54 and includes a hollow cylinder 85 in which an elastic cushioning member (not shown) such as a leaf spring or the like is incorporated and a hemispherical member 86 mounted on a top of the cylinder 85. A suitable number of oil dampers shown in FIG. 5 and a suitable number of struts shown in FIG. 6 are used in combination, wherein the struts function to substantially bear a weight and the oil dampers function to substantially absorb vibration.

Figure 7:
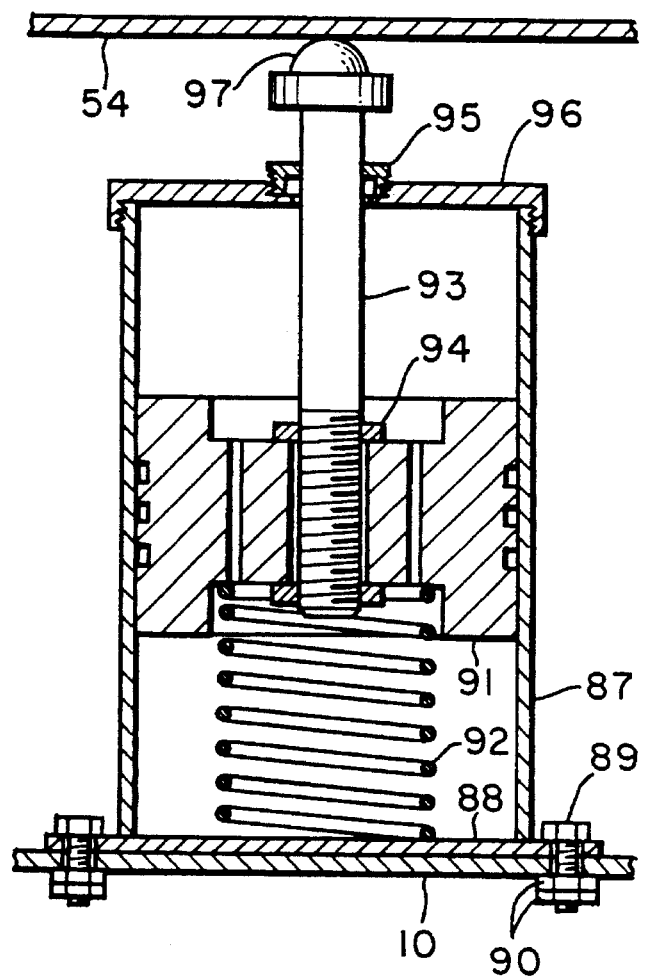

A vertical-type oil damper shown in FIG. 7 may be substituted for that of FIG. 5. The oil damper of FIG. 7 includes a tank 87 of which a bottom plate 88 is fixed on the lower base 10 by means of bolt-nut combinations. A piston 91 is supported on a coiled spring 92 arranged between the bottom plate 88 and the piston 91. The piston 91 is fitted on a lower portion of a rod 93 and then securely held thereon by means of upper and lower nuts 94 threadedly fitted on the rod 93 so as to interpose the piston 91 therebetween. Also, the rod 93 is arranged so as to be upwardly projected at an upper portion thereof through a center of each of a ring 95 and a lid 96 arranged for covering an upper end of the tank 87 from the tank 87. The rod 93 is mounted on an upper end thereof with a hemispherical member 97, which is abutted against a lower surface of the upper base 54.

Referring now to FIGS. 8 to 11, a second embodiment of a vibration proofing structure according to the present invention is illustrated. The first embodiment described above is constructed so as to exhibit a vibration proofing function against vibration in a horizontal direction such as a lateral direction or a longitudinal direction. A vibration proofing structure of the second embodiment is adapted to exhibit a vibration proofing function against vibration in a vertical direction as well as in a horizontal direction. Thus, the vibration proofing structure of the second embodiment is different in a guide mechanism from the first embodiment and includes a single horizontal-type oil damper unlike the first embodiment. Also, the vibration proofing structure of the second embodiment is used in combination with a vertical-type oil damper so as to proof vertical vibration and includes a plurality of springs arranged at suitable positions as described below with reference to FIGS. 8 and 10. In the second embodiment, two kinds of coiled springs may be incorporated for this purpose.

Figure 8:
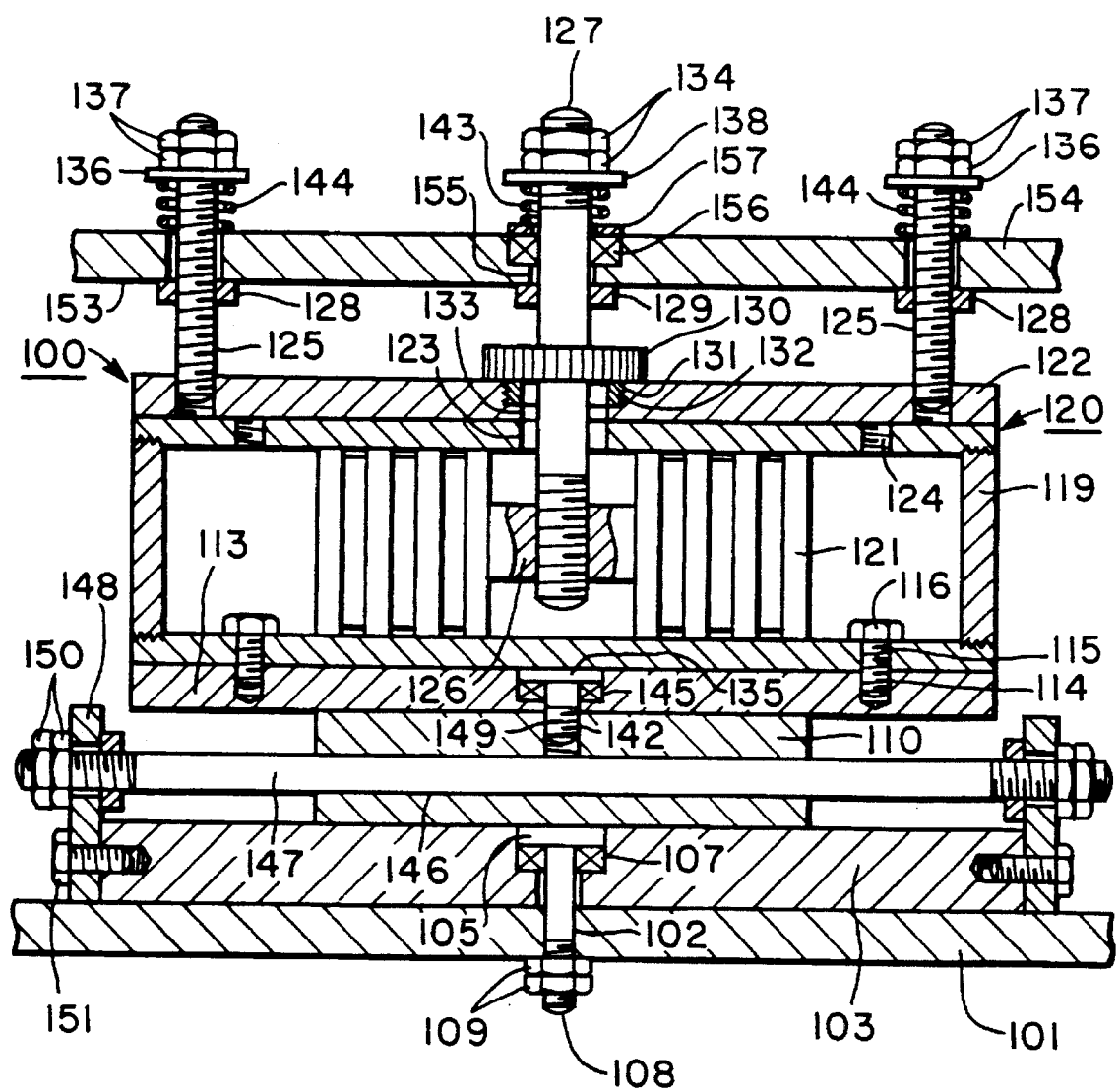
FIG. 8 is a vertical sectional view showing a second embodiment of a vibration proofing structure according to the present invention.
Figure 9:
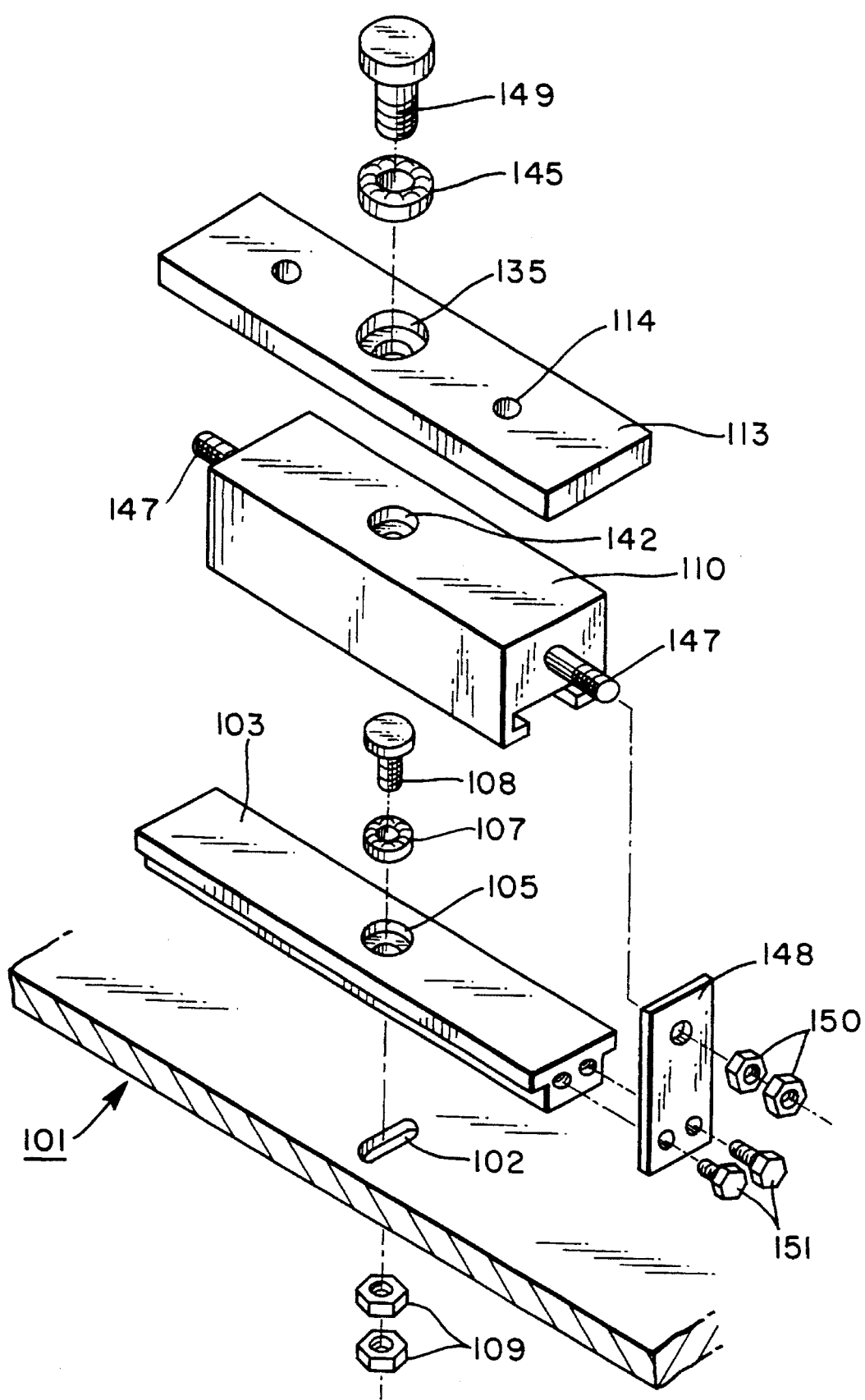
FIG. 9 is an exploded perspective view showing an essential part of the vibration proofing structure shown in FIG. 8.
Figure 10:
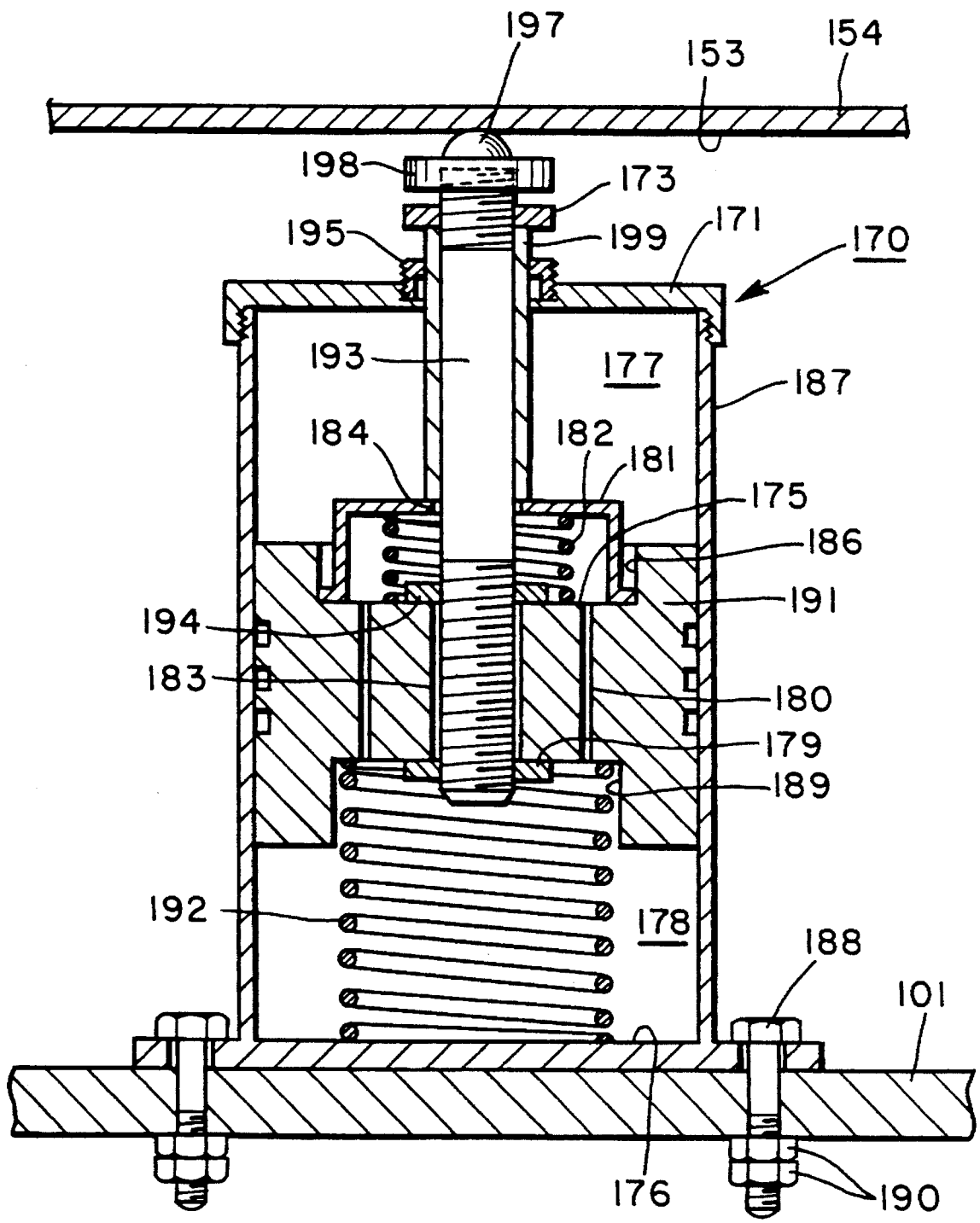
FIG. 10 is a side elevation view in section showing a vertical-type oil damper incorporated in the vibration proofing structure shown in FIG. 8.
Figure 11:
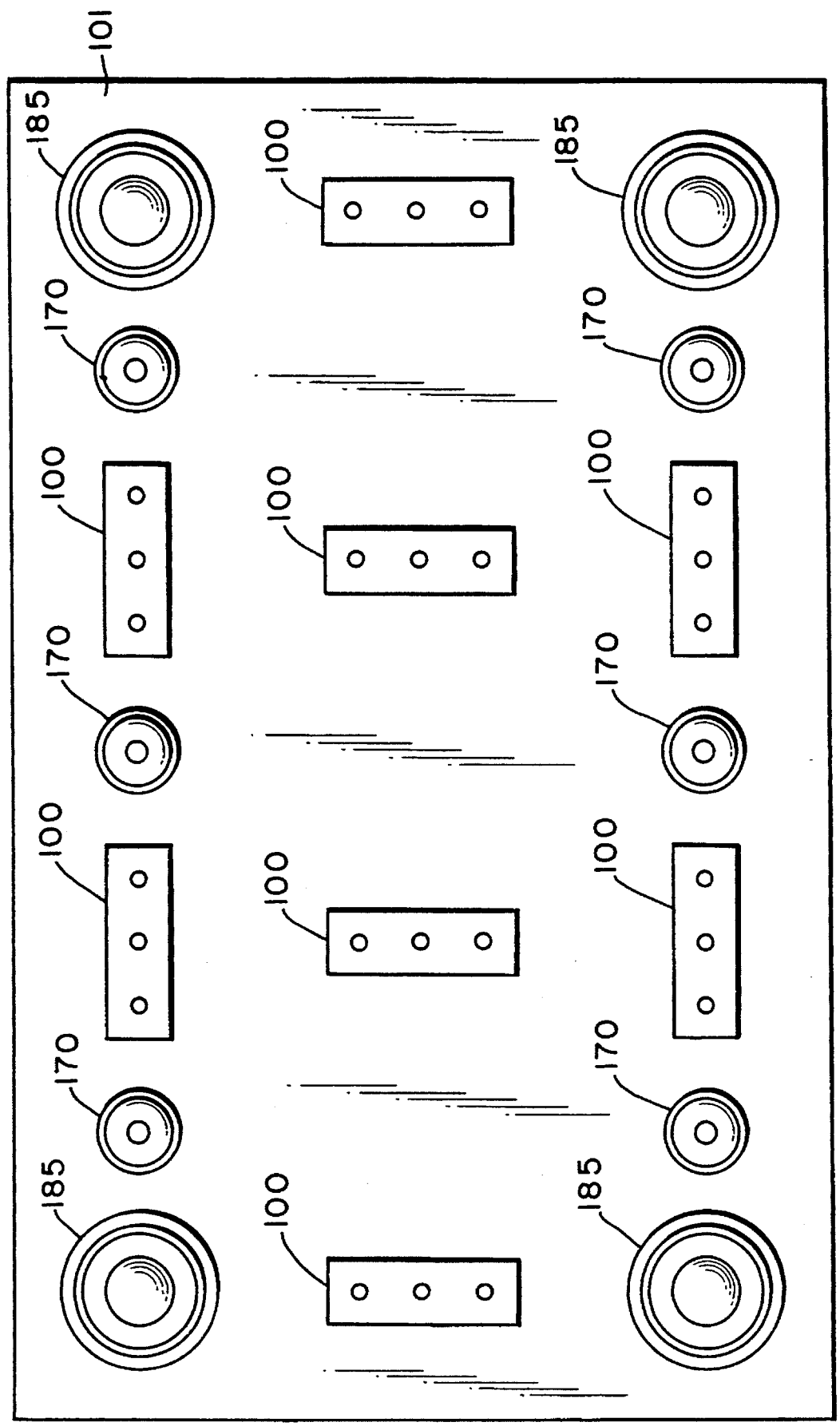
FIG. 11 is a plan view showing the arrangement of the components of the second embodiment of the vibration proofing structure inclusive of horizontal-type dampers, vertical-type dampers and struts on the bottom base.

FIG. 8 is a vertical sectional view showing a vibration proofing structure 100 including a horizontal-type oil damper 120, FIG. 9 is an exploded perspective view showing an essential part of a guide mechanism, FIG. 10 is a vertical sectional view showing a vertical-type oil damper 170, and FIG. 11 is a top plan view showing arrangement of the vibration proofing structure of the second embodiment from which a part thereof is omitted for the sake of brevity.

More particularly, the vibration proofing structure of the second embodiment includes a first or lower base 101 and an elongated rail 103 formed into a T-like shape in section as in the first embodiment and mounted on the lower base 101 by means of a bolt 108. The rail 103 is formed at a central portion thereof with an aperture 105, which is formed at a lower portion thereof with a circular depression (not shown). The depression is fitted therein with a bearing 107 and then the bolt 108 is downwardly inserted through the aperture 105. Thereafter, the bolt 108 is inserted at a lower portion thereof through a slot-like through-hole 102 of the base 101 and threadedly fitted on a lower end thereof with a double nut 109, resulting in the rail 103 being mounted on the base 101 while keeping a longitudinal axis of the rail 103 perpendicular to a longitudinal axis of the through-hole 102. The bolt 108 is formed into a diameter smaller than a width of the slot-like through-hole 102 defined in a lateral direction thereof, so that it may be reciprocated in the through-hole 102 along the longitudinal axis of the through-hole 102 in a lateral direction of the base 101, to thereby permit the rail 103 to be reciprocated in the lateral direction of the lower base 101. Also, the above-described construction permits the rail 103 to be horizontally rotated about the bearing 107.

The vibration proofing structure of the second embodiment also includes a guide member 110, which is formed on a lower surface thereof with a recess of a T-like shape in section so as to permit the rail 103 to be snugly filled in recess, resulting in being mounted on the rail 103 so as to be slidable in a longitudinal direction of the rail 103. The guide member 110 is formed with a circular through-hole 146 in a manner to horizontally extend in a longitudinal direction thereof, through which an elongated rod 147 of a circular shape in section is inserted. The rod 147 is connected at both ends thereof to both ends of the rail 103 by means of connection plates 148, respectively. As shown in FIGS. 8 and 9, double nuts 150 and bolts 151 are used for the purpose of the connection as above.

The guide member 110 is rotatably mounted thereon with a support plate 113, which is formed at a central portion thereof with a stepped through-hole, of which a step 135 is provided thereon with a bearing 145. Then, a bolt 149 is downwardly inserted via the through-hole and threadedly inserted at a lower portion thereof into a threaded hole 142 of the guide member 110, so that the support plate 113 may be mounted on the guide member 110 so as to be rotatable with respect to the guide member 110. The support plate 113 is fixedly mounted thereon with a horizontal-type oil damper 120. The oil damper 120 may be constructed in substantially the same manner as the oil dampers 20 and 44 incorporated in the first embodiment described above. The support plate 113 is formed at portions therefor spaced from each other in a longitudinal direction thereof with bolt holes 114. Reference numeral 119 designates a tank for the horizontal-type oil damper 120, which tank is formed into a rectangular cylindrical shape. The tank 119 is formed at a bottom thereof with threaded holes 115 in a manner to positionally correspond to or be aligned with the bolt holes 114 of the support plate 113. Then, a bolt 116 is threadedly inserted through each of the bolt holes 114 and the threaded hole 115 corresponding thereto, to thereby securely mount the tank 119 on the guide member 110. The tank 119 is formed at a central portion of a top thereof with an elongated aperture 123 having a longitudinal axis defined in a longitudinal direction of the tank 119. Also, the tank 119 is formed at portions of the top thereof spaced from each other in a longitudinal direction thereof with small apertures 124, through which oil is fed to spaces defined on both sides of an interior of the tank 119. The small apertures 124 each are closed with a screw after feeding of oil into the tank. The tank 119 is provided therein with a pair of pistons 121 in a manner to be arranged in a row in the longitudinal direction thereof. The pistons 121 are connected to each other through a connection bar 126 arranged therebetween. The connection bar 126 is threadedly mounted on a central portion thereof with a rod 127, which is arranged so as to upwardly extend from the connection bar 126, resulting in being upwardly projected through the aperture 123 from the tank 119. The tank 119 is provided on the top thereof with a holding plate 122, to thereby fully close the small aperture 124. The holding plate 122 is formed at a central portion thereof with an aperture 133 of the same configuration as the aperture 123 so as to positionally correspond to the aperture 123.

Above the holding plate 122, a second or upper base 154 is arranged so as to be spaced at a predetermined interval from the holding plate 122. The upper base 154 is formed at a portion thereof positionally corresponding to the aperture 123 of the tank 119 and the aperture 133 of the holding plate 122 with an aperture 155. The rod 127 upwardly extending from the interior of the tank 119 is upwardly inserted at an upper portion thereof through the apertures 123, 133 and 155 in turn. The rod 127 is fitted on a portion thereof positioned in the aperture 155 of the base 154 with a bearing 156. Also, the rod 127 is threadedly securely fitted on a portion thereof positioned above the bearing 156 with a bearing holder 157, to thereby prevent the bearing 156 from being dislocated from the aperture 155.

The holding plate 122 is threadedly mounted on both sides of an upper surface thereof defined in a longitudinal direction thereof with support rods 125 upwardly extending therefrom. The support rods 125 which are arranged so as to be spaced from each other in the longitudinal direction of the holding plate 122 each are upwardly slidably inserted through the upper base 154 and mounted on an upper end thereof with a washer-like spring bearing 136. The support rods 125 each are fitted on a portion thereof positioned between each of the spring bearings 136 and the base 154 with a support rod spring 144 of a predetermined spring constant. The rod 127 is mounted on an upper end thereof with a washer-like spring bearing 138 and fitted on a portion thereof positioned between the spring bearing 138 and the base 154 with a rod spring 143 of a predetermined spring constant.

The springs 143 and 144 may have the same spring constant, which may be set to be about 10 to 25. The springs 143 and 144 each may comprise a coiled spring. The vertical-type oil damper 170 briefly described above includes a bottom wall 176 and is provided therein with a piston 191, as shown in FIG. 10. Between the piston 191 and the bottom wall 176 is arranged a large spring 192 having a spring constant of about 30 to 80. Thus, the spring constant of the large spring 192 at least about three times as large as that of the springs 143 and 144. The large spring 192 may comprise a coiled spring. In such arrangement as shown in FIG. 11, the springs 143 and 144 and the large spring 192 may be formed into such dimensions as shown in Tables 2 to 5 in correspondence to large load (about 5 tons), intermediate load (about 3 tons) and small load (about 2 tons), respectively, wherein Table 3 shows the dimensions when the large coiled spring 192 comprises a double coil.

TABLE 2

| | Large Load (About 5 Tons) | |
|---|---|---|
| | Coiled Springs (143, 144) | Large Coiled Spring (192) |
| Wire Diameter | 5 mm | 40 mm |
| Outer Diameter of Coil | 29 mm | 220 mm |
| Number of Active Turns | 8 | 5.5 |
| Free Length of Coil | 50 mm | 330 mm |
| Spring Constant | 25 | 80 |

TABLE 3

| | Large Load (About 5 Tons) Use of Double Coiled Spring as Large Coiled Spring | |
|---|---|---|
| Wire Diameter | 30 mm | 20 mm |
| Outer Diameter of Coil | 200 mm | 120 mm |
| Number of Active Turns | 3.3 | 5.3 |
| Free Length of Coil | 160 mm | 150 mm |
| Spring Constant | 50 | 30 |

TABLE 4

| | Intermediate Load (About 3 Tons) | |
|---|---|---|
| | Coiled Springs (143, 144) | Large Coiled Spring (192) |
| Wire Diameter | 5 mm | 20 mm |
| Outer Diameter of Coil | 27 mm | 115 mm |
| Number of Active Turns | 5 | 3 |
| Free Length of Coil | 45 mm | 100 mm |
| Spring Constant | 12 | 60 |

TABLE 5

| | Small Load (About 3 Tons) | |
|---|---|---|
| | Coiled Springs (143, 144) | Large Coiled Spring (192) |
| Wire Diameter | 4 mm | 20 mm |
| Outer Diameter of Coil | 22 mm | 120 mm |
| Number of Active Turns | 4 | 5.3 |
| Free Length of Coil | 24 mm | 150 mm |
| Spring Constant | 10 | 30 |

Figure 12:
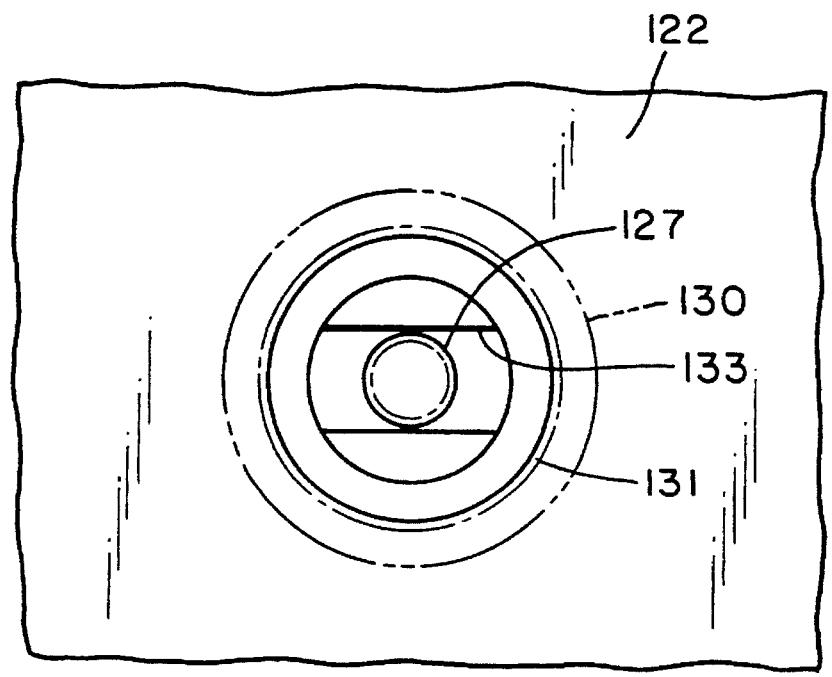
FIG. 12 is a plan view showing a part of the vibration proofing structure of FIG. 8.

In FIG. 8, reference numerals 128 and 129 designate nuts for positioning the support rods 125 and rod 127, respectively, and 130 is an oil leakproof lid through which the rod 127 is inserted, of which a mounting manner is detailedly shown in FIG. 12. For the purpose of permitting the oil leakproof lid 130 to prevent oil in the tank 119 from leaking therefrom, a threaded cylinder 131 of a small length, as shown in FIGS. 8 and 12, is threadedly fitted in a threaded aperture 132 of the holding plate 122 so as to be concentric with the aperture 133 of the holding plate 122 and then the lid 130 is tightly contacted with the threaded cylinder 131 while being kept threadedly fitted on the rod 127. The cylinder 131 is formed into an inner diameter equal to or larger than a maximum diameter of the elongated aperture 133 having a longitudinal axis defined in the longitudinal direction of the tank 119. In FIG. 8, reference numerals 134 and 137 designate double nuts threadedly mounted on the rod 127 and support rods 125, respectively.

FIG. 10, as described above, shows the vertical-type oil damper 170. The vertical-type oil damper 170 is fixed on the lower base 101 by means of bolts 188 and double nuts 190 and contacted at an upper portion thereof with a rear surface 153 of the upper base 154 through a hemispherical member 197 mounted on an upper end of a rod 193 through a seat 198. In FIG. 10, reference numerals 179 and 194 each designate a nut for fixing a rod 193 in the piston 191. 183 is a through-hole formed via the piston 191 briefly described above for inserting the rod 193 therethrough and 184 is a through-hole formed via a bowl-like cap 181 therethrough. In order to facilitate arrangement of the bowl-like cap 181 on the piston 191 while keeping a coiled spring member 182 fitted on the rod 193 between the cap 181 and the piston 191, the piston 191 is preferably formed on an upper surface thereof with a recess 186 acting as a spring bearing as well as a cap receiver, as shown in FIG. 10. Also, the piston 191 is preferably formed on a lower surface thereof with a recess 189 acting as a spring bearing, to thereby facilitate arrangement of the large spring 192 between the piston 191 and the above-described lower wall 176 of the oil damper 170. Reference numeral 195 designates an oil leakproof cap for preventing oil from leaking from the oil damper 170. The cap 195 is threadedly fitted in the lid 171 of the oil damper 170 and the rod 193 is inserted through a central portion of the cap 195. Reference numeral 180 designates through-holes vertically formed via the piston 191 so as to act as an oil passage means.

Figure 13:
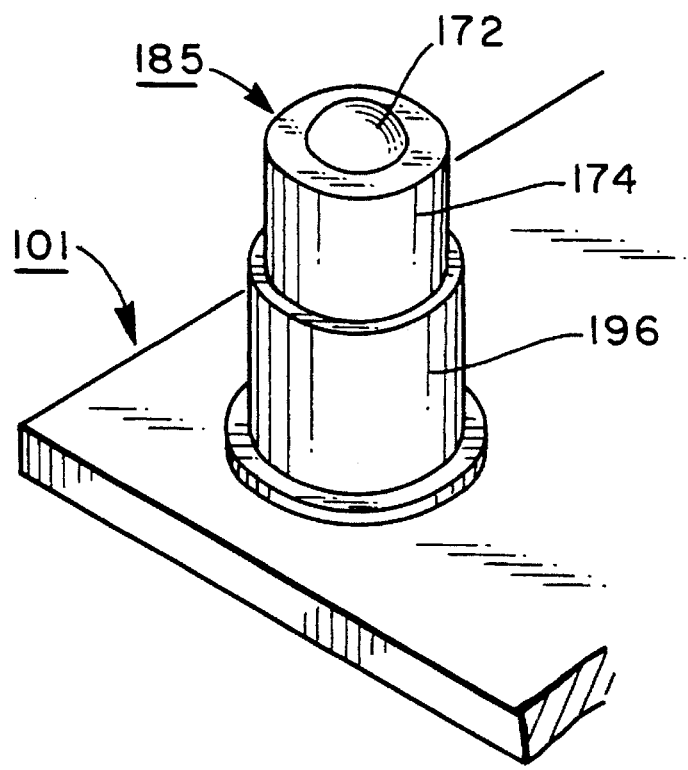
FIG. 13 is a perspective view showing a strut incorporated in the vibration proofing structure of FIG. 8.

FIG. 11, as briefly described above, shows an example of arrangement of the vibration proofing structures 100 each including the horizontal-type oil damper 120, the vertical-type oil dampers 170 and struts 185. In the example shown in FIG. 11, eight such vibration proofing structures 100, six such vertical-type oil damper 170 are arranged. The struts 185 each include a cylinder 174 of a small length having a hemispherical member 172 mounted on an upper end thereof and a cylindrical pedestal 196 for fittedly holding the cylinder 174 therein, as shown in FIG. 13. More particularly, the cylindrical pedestal 196 is provided therein with an elastic cushioning member (not shown), so that the cylinder 174 may be kept elastically upwardly forced to maintain the strut 185 at a predetermined height or to make a height of the strut 185 correspond to an interval between the second or upper base 154 and the first or lower base 101. The cylindrical pedestal 196 is fixedly bolted to the lower base 101 which is formed into a rectangular shape.

In the example shown in FIG. 11, the struts 185 are located on the lower rectangular base 101 so as to be in proximity to corners thereof. Each one vibration proofing structure 100 including the horizontal-type oil damper is arranged between the struts 185 along each of short sides of the base 101 in such a manner that a longitudinal axis of the structure 100 lies parallel with a lateral axis of the lower base 101. Also, each three vertical-type oil dampers 170 are arranged in a row between the struts 185 along each of long sides of the lower rectangular base 101, wherein two of the three dampers 170 are positioned in proximity to the struts 185, respectively, and the remaining damper 170 is intermediate between the two dampers 170. Between each adjacent two of the vertical-type oil dampers 170 arranged along each of the long sides of the base 101 is arranged the vibration proofing structure 100 including the horizontal-type oil damper in such a manner that the longitudinal axis of the structure 100 lies parallel to a longitudinal axis of the base 100. This results in the vibration proofing structures 100 located on both long sides of the base 101 being rendered positionally opposite to each other. Further, each one vibration proofing structure 100 is arranged between each two vibration proofing structures 100 located on both long sides of the base 101 so as to be opposite to each other in such a manner that a longitudinal axis of the one vibration proofing structure is rendered perpendicular to that of the two ones or defined in the lateral direction of the base 101. The arrangement shown in FIG. 11 is a mere example, therefore, the number of components arranged may be varied as desired depending on a total weight or load of an object such as a construction or the like carried on the upper base 154.

As described above, the total weight is substantially supported by the struts 185. However, when vertical vibration is applied to the arrangement, the vertical-type oil dampers 170 bear it for a slight period of time. Thus, adjustment of viscous damping of each of the vertical-type oil dampers 170 by means of the adjustment nut 173 is carried out depending on the total weight and settlement of the arrangement.

Now, the manner of operation of the vibration proofing structure of FIGS. 8 to 11 will be described hereinafter.

As will be noted from the foregoing, the vibration proofing structure is so constructed that the first or lower base 101 and second or upper base 154 are arranged; the plural rails 103 are mounted at predetermined positions on the lower base 101; the guide members 110 each are fittedly mounted on each of the rails 103 so as to be slidable in the longitudinal direction of the rail 103; each of the plural horizontal-type oil dampers 120 is rotatably mounted on the guide member 110 and includes the tank 119 rotatably mounted on the guide member 110, the pistons 121 arranged in the tank 119, the rod 127 mounted at one end thereof on the pistons so as to render the axis thereof perpendicular to the longitudinal axis of the pistons 121 and outwardly extending at the other end thereof from the tank 119 so as to be slidably inserted through the second or upper base 154; the plural struts 185 each are mounted on the lower base 101 for bearing load downwardly applied through the upper base 154, arranged so as to upwardly extend therefrom and provided on the upper end thereof with the hemispherical member 172; the holding plates 122 each are arranged on each of the horizontal-type oil dampers 120; and the rod 127 is inserted at the other end thereof through the holding plate 122 so as to permit the horizontal-type oil damper 120 to be rotated about the rod 127 with respect to the holding plate 122 and is inserted through the upper base 154 while being rotatably supported by means of the bearing 156 so as to permit the horizontal-type oil damper 120 to be rotated with respect to the second base 154.

Such construction, when complicated vibration in both horizontal and vertical directions such as vibration at a place near a seismic center is applied to the lower base 101, effectively prevents vibration in the horizontal direction from being transmitted to the upper base 154.

The lower base 101 is guided by a guide mechanism comprising the rail 103 and guide member 110, to thereby be reciprocated while leaving the oil damper 120, resulting in preventing transmission of vibration to the oil damper 120. In this instance, the base 101 would often fail to smoothly reciprocate due to application, to the oil damper 120, of large load sufficient to cause increased friction to be produced between the guide mechanism and the oil damper 120. However, when the base 101 fails to smoothly reciprocate, the oil damper 120 acts as a vibration absorber for absorbing the vibration. More particularly, a phenomenon that the base 101 is to reciprocate while leaving the oil damper 120 and a vibration absorbing action of the oil damper 120 cooperate with each other to effectively absorb vibration. Vibration in a direction oblique to the oil damper 120 is often applied to the base 101. Application of the oblique vibration causes the lower base 101 to reciprocate by a distance corresponding to a component of the vibration and/or the oil damper 120 to exhibit a vibration absorbing action depending on the component.

The vibration proofing structure shown in FIGS. 8 to 11, as described above, is further constructed that the support rods 125 are mounted on an upper surface of each of the holding plates 122 so as to be spaced from each other in a longitudinal direction of the holding plate 122 and upwardly extend therefrom. Each of the support rods 125 is vertically slidably inserted through the second or upper base 154 and provided at an upper end thereof with the washer-like spring bearing 136, and is fitted on the portion thereof defined between the spring bearing 136 and the upper base 154 with the support rod spring 144 of a predetermined spring constant. The rod 127 is mounted on the upper end thereof with the washer-like spring bearing 138 and fitted on the portion thereof defined between the spring bearing 138 and the upper base 154 with the rod spring 143 of a predetermined spring constant. The vibration proofing structure also includes the plural vertical-type oil dampers 170 arranged in proximity to the horizontal-type oil dampers 120. The vertical-type oil dampers 170 each include the vertical-type cylinder 187, the piston 191 arranged in the cylinder 187 to define an upper oil chamber 177 and a lower oil chamber 178 therethrough in the cylinder 187 and formed with the oil passage means 180 in a manner to vertically extend therethrough, and the control means for externally controlling the amount of oil transferred through the oil passage means 180 between the upper oil chamber 177 and the lower oil chamber 178. The vertical-type oil dampers 170 each are provided therein with the large spring 192 in a manner to be interposed between the piston 191 and the bottom wall 176 of the vertical-type cylinder 187, wherein the large spring 192 has a spring constant of at least about three times as large as the spring constant of each of the springs 143 and 144. Such construction effectively prevents vertical vibration such as vibration occurring at a place near a seismic center from being transmitted from the first or lower base 101 to the second or upper base 154.

More particularly, vertical vibration applied to the lower base 101 causes vertical vibration of the rail 103 and guide member 110 together with the horizontal-type oil damper 120, rod 127 and support rods 125. However, the springs 143 and 144 and the large spring 192 cooperate with the vertical-type oil damper 170 to attenuate the vertical vibration, to thereby prevent it from being transmitted to the upper base 154. The reason why the spring constant of each of the springs 143 and 144 and that of the large spring 192 are respectively set to be about 10 to 25 and about 30 to 80 is that the spring constants below the respective ranges described above cause the springs to fail to exhibit satisfactory vibration attenuation functions, whereas the spring constants above the ranges lead to an excessive increase in rigidity of the springs. In the illustrated embodiment, as shown in FIG. 11, the number of springs 143 and 144 arranged is twenty-four (24) which is three times as large as the number (8) of horizontal-type oil dampers 120 and the number of large springs 192 is six (6) which is the same as that of vertical-type oil dampers 170.

The large spring 192 is arranged between the piston 191 and the bottom 176 of the cylinder 187 while being kept compressed to a predetermined degree, to thereby eliminate an inherent time-lag defect of an oil damper that it exhibits a cushioning action after somewhat delay from application of vibration thereto. Thus, the vibration proofing structure of the illustrated embodiment exhibits a cushioning action upon application of vertical vibration thereto.

Now, the manner of operation of the vibration proofing structure shown in FIGS. 8 to 11 carried out when vertical vibration is applied thereto will be described hereinafter. The struts 185 each are somewhat separated from the upper base 154 immediately after vertical vibration is applied to the lower base 101 and then are returned to the original position in a slight period of time as short as fractions of one second, during which the vertical-type oil dampers 170 each support the upper base 154. Application of excessive stress to the horizontal-type oil damper 120 is prevented by compression of the springs 143 and 144. Also, vibration which acts to cause each of the struts 185 to push up the upper base 154 is absorbed by the vertical-type oil damper 170. Even when the upper base 154 is slightly pushed up, it is returned in a slight period of time as described above. Thus, the oil damper 170 cooperates with the springs 143 and 144 and large spring 192 to minimize vertical movement of the upper base 154. The vertical-type oil burner 170 is provided at the top thereof with the hemispherical member 197 for the purpose of minimizing an effect of horizontal vibration of the lower base 101 on the upper base 154.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A vibration proofing structure comprising:

a first base;

a first oil damper mounted on said first base;

said first oil damper including a first tank mounted on said first base, first pistons arranged in said first tank, and a first rod having a first end and a second end, said first end of said first rod being mounted on said first pistons so as to render an axis of said first rod perpendicular to a longitudinal axis of said first pistons, said second end of said first rod outwardly extending from said first tank;

a second oil damper including a second tank, second pistons arranged in said second tank, and a second rod having a first end and a second end, said first end of said second rod being mounted on said second pistons so as to render an axis of said second rod perpendicular to a longitudinal axis of said second pistons, said second end of said second rod outwardly extending from said second tank; and a second base on which the second end of said second rod is mounted;

said first and second oil dampers being juxtaposed to each other;

said second end of said first rod being connected to said second tank of said second oil damper, and said first rod of said first oil damper being connected to said second tank of said second oil damper so as to permit said first and second oil dampers to rotate relative to each other.

2. A vibration proofing structure as defined in claim 1, wherein said first tank of said first soil damper is mounted on said first base so as to permit said first oil damper and first base to rotate relative to each other.

3. A vibration proofing structure as defined in claim 1, further comprising an intermediate plate fixed on said second oil damper so as to be arranged between said first oil damper and said second oil damper which are connected to each other so as to rotate relative to each other;

said intermediate plate being provided with a bearing for rotatably supporting said first rod of said first oil damper;

supports, each mounted on said first base so as to extend therefrom and positioned on each of both sides of said first oil damper so as to be spaced at a small interval therefrom; and rod members each mounted on each of said supports, so as to inwardly extend therefrom in a direction parallel to a direction of sliding of said pistons, to thereby connect said intermediate plate and each of said supports to each other therethrough in a non-fixed manner.

4. A vibration proofing structure comprising:

a first base;

a first oil damper mounted on said first base;

said first oil damper including a first tank mounted on said first base, first pistons arranged in said first tank, and a first rod having a first end and a second end, said first end of said first rod being mounted on said first pistons so as to render an axis of said first rod perpendicular to a longitudinal axis of said first pistons, said second end of said first rod outwardly extending from said first tank;

a second oil damper including a second tank, second pistons arranged in said second tank, and a second rod having a first end and a second end, said first end of said second rod being mounted on said second pistons so as to render an axis of said second rod perpendicular to a longitudinal axis of said second pistons, said second end of said second rod outwardly extending from said second tank; and a second base on which the second end of said second rod is mounted;

said first and second oil dampers being juxtaposed to each other;

said second end of said first rod being connected to said second tank of said second oil damper, and said second end of said second rod is mounted on said second base so as to permit said second oil damper and second base to rotate relative to each other.

5. The vibration proofing structure as claimed in claim 4, further comprising struts for substantially bearing the weight of the second base and load downwardly applied to the second base, said struts each being vertically mounted on the first base, and a hemispherical member which is elastically supported at one end of each of said struts, said hemispherical member being kept contacted with a lower surface of the second base.

6. A vibration proofing structure for large load comprising:

a first base and a second base;

a plurality of rails mounted at predetermined positions on said first base;

guide members each fittedly mounted on each of said rails so as to be slidable in a longitudinal direction of said rail;

a plurality of horizontal-type oil dampers each rotatably mounted on each of said guide members;

said horizontal-type oil dampers each including a tank rotatably mounted on each of said guide members, pistons arranged in said tank, a rod having a first end and a second end, said first end being mounted on said pistons so as to render an axis of said rod perpendicular to a longitudinal axis of said pistons and said second end of said rod outwardly extending from said tank so as to be slidably inserted through said second base;

a plurality of struts each mounted on said first base for bearing load downwardly applied through said second base, arranged so as to upwardly extend therefrom and provided on an upper end thereof with a hemispherical member;

holding plates each arranged on each of said horizontal-type oil dampers;

said rod being inserted through said holding plate so as to permit said horizontal-type oil damper to be rotated about said rod with respect to said holding plate and being inserted through said second base while being rotatably supported by means of a bearing so as to permit said horizontal-type oil damper to be rotated with respect to said second base;

support rods mounted on an upper surface of each of said holding plates so as to be spaced from each other in a longitudinal direction of said holding plate and upwardly extend therefrom;

said support rods each being vertically slidably inserted through said second base and provided at an upper end thereof with a primary washer-like spring bearing;

said support rods each being fitted on a portion thereof defined between said primary spring bearing and said second base with a support rod spring of a predetermined spring constant;

said rod being mounted on an upper end thereof with a secondary washer-like spring bearing and fitted on a portion thereof defined between said secondary spring bearing and said second base with a rod spring of a predetermined spring constant; and a plurality of vertical-type oil dampers arranged in proximity to said horizontal-type oil dampers;

said vertical-type oil dampers each including a vertical-type cylinder, a piston arranged in said cylinder to define an upper oil chamber and a lower oil chamber therethrough in said cylinder and formed with an oil passage means in a manner to vertically extend therethrough, and a control means for externally controlling the amount of oil transferred through said oil passage means between said upper oil chamber and said lower oil chamber;

said vertical-type oil dampers each being provided therein with a large spring in a manner to be interposed between said piston and a bottom of said vertical-type cylinder, said large spring having a spring constant about three times as large as said spring constant of each of said support rod springs and said rod spring.

7. A vibration proofing structure as defined in claim 6, wherein said spring constant of said rod spring and each of said support rod springs is set to be about 10 to 25.

8. A vibration proofing structure as defined in claim 6, wherein said spring constant of said large spring is set to be about 30 to 80.

9. A vibration proofing structure as defined in claim 6, wherein said control means for externally controlling the amount of oil transferred between said upper oil chamber and said lower oil chamber through said oil passage means comprises:

a bowl-like cap arranged on said piston for controlling the amount of oil-transferred between said upper oil chamber and said lower oil chamber through said oil passage means;

a spring member arranged between said cap and an upper surface of said piston to upwardly force said cap;

a rod member which is vertically arranged in said vertical-type cylinder so as to be upwardly projected at an upper end thereof from said vertical-type cylinder and on which said piston is fitted;

a pipe fitted on said rod member in said vertical-type cylinder for adjusting a gap between said cap and said upper surface of said piston; and an adjustment nut threadedly fitted on said rod member so as to be positioned at an upper end of said pipe, so that slight vertical movement of said adjustment nut permits the gap between said cap and said upper surface of said piston to be adjusted to control the amount of oil transferred between said upper oil chamber and said lower oil chamber;

said large spring being arranged between said piston and said bottom of said cylinder while being kept compressed to a predetermined degree.

10. A vibration proofing structure for large load comprising:

a first base and a second base;

a plurality of rails mounted at predetermined positions on said first base;

guide members each fittedly mounted on each of said rails so as to be slidable in a longitudinal direction of said rail;

a plurality of horizontal-type oil dampers each rotatably mounted on each of said guide members;

said horizontal-type oil dampers each including a tank rotatably mounted on each of said guide members, pistons arranged in said tank, a rod having a first end and a second end, said first end mounted on said pistons so as to render an axis of said rod perpendicular to a longitudinal axis of said pistons and said second end of said rod outwardly extending from said tank so as to be slidably inserted through said second base;

a plurality of struts each mounted on said first base for bearing load downwardly applied through said second base, arranged so as to upwardly extend therefrom and provided on an upper end thereof with a hemispherical member;

holding plates each arranged on each of said horizontal-type oil dampers;

said rod being inserted through said holding plate so as to permit said horizontal-type oil damper to be rotated about said rod with respect to said holding plate and being inserted through said second base while being rotatably supported by means of a bearing so as to permit said horizontal-type oil damper to be rotated with respect to said second base;

support rods mounted on an upper surface of each of said holding plates so as to be spaced from each other in a longitudinal direction of said holding plate and upwardly extend therefrom;

said support rods each being vertically slidably inserted through said second base and provided at an upper end thereof with a primary washer-like spring bearing;

said support rods each being fitted on a portion thereof defined between said primary spring bearing and said second base with a support rod spring of a predetermined spring constant; and said rod being mounted on an upper end thereof with a secondary washer-like spring bearing and fitted on a portion thereof defined between said secondary spring bearing and said second base with a rod spring of a predetermined spring constant; and a plurality of vertical-type oil dampers arranged in proximity to said horizontal-type oil dampers;

said vertical-type oil dampers each including a vertical-type cylinder, a piston arranged in said cylinder to define an upper oil chamber and a lower oil chamber therethrough in said cylinder and formed with an oil passage means in a manner to vertically extend therethrough, and a control means for externally controlling the amount of oil transferred through said oil passage means between said upper oil chamber and said lower oil chamber;

said vertical-type oil dampers each being provided therein with a large spring in a manner to be interposed between said piston and a bottom of said vertical-type cylinder, said large spring having a spring constant greater than said spring constant of said rod spring and each of said support rod springs.

11. The vibration proofing structure as claimed in claim 10, wherein, said spring constant of said large spring is at least about three times as large as said spring constant of said rod spring and each of said support rod springs.

12. A vibration proofing structure comprising:

a first base;

a first oil damper mounted on said first base;

said first oil damper including a first tank mounted on said first base, first pistons arranged in said first tank, and a first rod having a first end and a second end, said first end of said first rod being mounted on said first pistons so as to render an axis of said first rod perpendicular to a longitudinal axis of said first pistons, said second end of said first rod outwardly extending from said first tank;

a second oil damper including a second tank, second pistons arranged in said second tank, and a second rod having a first end and a second end, said first end of said second rod being mounted on said second pistons so as to render an axis of said second rod perpendicular to a longitudinal axis of said second pistons, said second end of said second rod outwardly extending from said second tank;

a second base on which the second end of said second rod is mounted;

said first and second oil dampers being juxtaposed to each other;

said second end of said first rod being connected to said second tank of said second oil damper;

said first rod being connected to said second tank of said second oil damper so as to permit said first and second oil dampers to rotate relative to each other; and said second rod is mounted on said second base so as to permit said second oil damper and second base to rotate relative to each other;

an intermediate plate fixed on said second oil damper so as to be arranged between said first oil damper and said second oil damper which are connected to each other so as to rotate relative to each other;

said intermediate plate being provided with a bearing for rotatably supporting said first rod of said first oil damper;

supports, each mounted on said first base so as to extend therefrom and positioned on each of both sides of said first oil damper so as to be spaced at a small interval therefrom; and rod members each mounted on each of said supports so as to inwardly extend therefrom in a direction parallel to a direction of sliding of said pistons, to thereby connect said intermediate plate and each of said supports to each other therethrough in a non-fixed manner.

13. A vibration proofing structure as claimed in claim 12, wherein said first tank of said first oil damper is mounted on said first base so as to permit said first oil damper and first base to rotate relative to each other.

14. The vibration proofing structure as claimed in claim 12, further comprising a plurality of struts each mounted on said first base for bearing load downwardly applied through said second base, arranged so as to upwardly extend therefrom and provided on an upper end thereof with a hemispherical member;

said hemispherical member being elastically supported at one end of each of said struts and kept contacted with a lower surface of the second base.

15. The vibration proofing structure as claimed in claim 14, wherein said vertical-type oil dampers are incorporated between the first base and the second base and fixed to one of the second and first bases;

said hemispherical member positioned at one end of each of said vertical-type oil dampers, said hemispherical member being kept contacted with the other one of said first and second bases which does not fix the vertical-type oil dampers.

16. A vibration proofing structure comprising:

a first base;

a first oil damper mounted on said first base;

said first oil damper including a first tank mounted on said first base, first pistons arranged in said first tank, and a first rod having a first end and a second end, said first end of said first rod being mounted on said first pistons so as to render an axis of said first rod perpendicular to a longitudinal axis of said first pistons, said second end of said first rod outwardly extending from said first tank;

a second oil damper including a second tank, second pistons arranged in said second tank, and a second rod having a first end and a second end, said first end of said second rod being mounted on said second pistons so as to render an axis of said second rod perpendicular to a longitudinal axis of said second pistons, said second end of said second rod outwardly extending from said second tank; and a second base on which the second end of said second rod is mounted;

said first and second oil dampers being juxtaposed to each other;

said second end of said first rod being connected to said second tank of said second oil damper;

struts for substantially bearing the weight of the second base and load downwardly applied to the second base, said struts each being vertically mounted on the first base, and a hemispherical member which is elastically supported at one end of each of said struts, said hemispherical member being kept contacted with a lower surface of the second base.

17. The vibration proofing structure as claimed in claim 16, wherein said second end of said first rod is connected to said second tank of said second oil damper so as to permit said first and second oil dampers to rotate relative to each other.

18. The vibration proofing structure as claimed in claim 16, further comprising plural vertical-type oil dampers which are incorporated between the first base and the second base and fixed to one of the second and first bases, and said hemispherical member being disposed at one end of each of said vertical-type oil dampers, said hemispherical member being kept contacted with the other one of said first and second bases which does not fix the vertical-type oil dampers.

* * * * *